United States Patent
Tisch

(10) Patent No.: US 11,109,154 B2
(45) Date of Patent: Aug. 31, 2021

(54) METHOD AND APPARATUS FOR DYNAMIC REDUCTION OF CAMERA BODY ACOUSTIC SHADOWING IN WIND NOISE PROCESSING

(71) Applicant: GoPro, Inc., San Mateo, CA (US)

(72) Inventor: Erich Tisch, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/002,122

(22) Filed: Aug. 25, 2020

(65) Prior Publication Data
US 2021/0084409 A1    Mar. 18, 2021

Related U.S. Application Data

(60) Provisional application No. 62/900,903, filed on Sep. 16, 2019.

(51) Int. Cl.
| | |
|---|---|
| *H04R 3/00* | (2006.01) |
| *H04N 5/225* | (2006.01) |
| *G10L 21/0272* | (2013.01) |
| *H04R 1/40* | (2006.01) |
| *G10L 25/51* | (2013.01) |
| *G10L 21/0232* | (2013.01) |
| *H04R 29/00* | (2006.01) |
| *G10L 21/0216* | (2013.01) |

(52) U.S. Cl.
CPC .......... *H04R 3/005* (2013.01); *G10L 21/0232* (2013.01); *G10L 21/0272* (2013.01); *G10L 25/51* (2013.01); *H04N 5/2258* (2013.01); *H04R 1/406* (2013.01); *H04R 29/005* (2013.01); *G10L 2021/02166* (2013.01); *H04R 2410/01* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 9,838,815 B1* | 12/2017 | Zhang | H04R 29/004 |
| 2017/0337932 A1* | 11/2017 | Iyengar | G10L 21/0208 |
| 2018/0358036 A1* | 12/2018 | Ryou | G10L 21/0232 |

* cited by examiner

*Primary Examiner* — Paul W Huber
(74) *Attorney, Agent, or Firm* — Young Basile Hanlon & MacFarlane, P.C.

(57) ABSTRACT

An image capture device includes a processor for wind noise processing. The processor receives signals from a first microphone, a first plurality of microphones, and a second plurality of microphones. The processor may segment each signal into low frequency bins and high frequency bins. The processor may select a minimum level signal bin for each low frequency bin. For the high frequency bins, the processor may select a minimum level signal bin for a first group of microphones or a second group of microphones. The processor may generate a composite signal by combining the selected minimum level signal bins for each low frequency bin and the selected minimum level signal bins for each high frequency bin.

20 Claims, 12 Drawing Sheets

METHOD AND APPARATUS FOR DYNAMIC
REDUCTION OF CAMERA BODY ACOUSTIC
SHADOWING IN WIND NOISE PROCESSING

CROSS-REFERENCE TO RELATED
APPLICATION

This application claims priority to and the benefit of U.S. Provisional Patent Application No. 62/900,903, filed Sep. 16, 2019, the entire disclosure of which is hereby incorporated by reference.

TECHNICAL FIELD

This disclosure relates to audio capture wind noise processing for electronic devices.

BACKGROUND

Dual-lens cameras are used to simultaneously record from a first-person perspective using a forward-facing lens and of the user using a rear-facing lens. Images from the dual lenses may be stitched together to create a spherical image. Single-lens and multi-lens cameras typically have multiple microphones to record an audio stream. Wind noise processing performance typically suffers in single-lens and dual-lens cameras in the form of acoustic shadowing artifacts due to the increased number of microphones and the camera geometry.

SUMMARY

Disclosed herein are implementations of wind noise processing and acoustic shadowing reduction. An aspect includes an image capture device. The image capture device includes a first image sensor facing a first direction. The first image sensor may be configured to obtain first image data. The image capture device may include a second image sensor facing a second direction. The second direction may be diametrically opposed to the first direction. The second image sensor may be configured to obtain second image data. The image capture device may include a microphone facing the first direction. The image capture device may include a first plurality of microphones facing the second direction. The image capture device may include a second plurality of microphones facing a third direction. The third direction may be perpendicular to the first and second directions.

In one or more aspects, the image capture device may include a processor. The processor may be configured to receive a signal from the microphone, the first plurality of microphones, the second plurality of microphones, or any combination thereof. In one or more aspects, the processor may be configured to segment each signal into low frequency bins, high frequency bins, or both. In one or more aspects, the processor may be configured to select a minimum level signal bin for each low frequency bin. In one or more aspects, the processor may be configured to, for the high frequency bins, determine a minimum level signal bin for a first group of microphones and determine a minimum signal level bin for a second group of microphones. In one or more aspects, the first group of microphones may include the microphone, the first plurality of microphones, and the second plurality of microphones. In one or more aspects, the second group of microphones may include the second plurality of microphones. In one or more aspects, the processor may be configured to determine a difference between the minimum level signal bin of the first group of microphones and the minimum level signal bin of the second group of microphones. In one or more aspects, the processor may be configured to select a minimum level signal bin for each high frequency bin based on the difference. In one or more aspects, the processor may be configured to generate a composite signal by combining the selected minimum level signal bins for each low frequency bin and the selected minimum level signal bins for each high frequency bin.

An aspect may include a method that includes receiving signals from a plurality of microphones. The method may include segmenting each signal into low frequency bins, high frequency bins, or both. The method may include selecting, for each low frequency bin, a minimum level signal bin for each signal from the plurality of microphones. The method may include processing, for each high frequency bin, signals from the plurality of microphones and signals from a subset of the plurality of microphones. The method may include comparing the signals the plurality of microphones and the signals of the subset of the plurality of microphones. The method may include selecting, for each high frequency bin, a minimum signal level bin of each signal from the plurality of microphones or a minimum signal level bin of each signal from the subset of the plurality of microphones. The method may include concatanating the selected minimum level signal bins of the low frequency bins with the selected minimum level signal bins of the high frequency bins.

An aspect may include an integrated circuit. The integrated circuit includes a first extractor, a second extractor, a first sampler, a second sampler, a third sampler, a comparator, a switch, a concatenator, or any combination thereof. The first extractor may be configured to receive signals from a microphone, a first plurality of microphones, a second plurality of microphones, or any combination thereof. The first extractor may be configured to segment each signal into low frequency bins, high frequency bins, or both. The second extractor may be configured to receive the signals from the microphone, the first plurality of microphones, the second plurality of microphones, or any combination thereof. The second extractor may be configured to segment each signal into low frequency bins, high frequency bins, or both. In one or more aspects, the first sampler may be configured to select a minimum level signal bin for each low frequency bin. In one or more aspects, the second sampler may be configured to process the high frequency bins. The second sampler may be configured to determine a minimum level signal bin for a first group of microphones comprising the microphone, the first plurality of microphones, and the second plurality of microphones. In one or more aspects, the third sampler may be configured to process the high frequency bins. The third sampler may be configured to determine a minimum signal level bin for a second group of microphones comprising the second plurality of microphones. In one or more aspects, the comparator may be configured to determine a difference between the minimum level signal bin of the first group of microphones and the minimum level signal bin of the second group of microphones. In one or more aspects, the switch may be configured to select a minimum level signal bin for each high frequency bin based on the difference. In one or more aspects, the concatenator may be configured to generate a composite signal. The composite signal may be generated by combining the selected minimum level signal bins for each low frequency bin and the selected minimum level signal bins for each high frequency bin.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

In the implementations described herein, wind noise processing may be performed to reduce acoustic shadowing. In one or more implementations, all microphones may be used for low frequency signals that are unaffected by acoustic shadowing. For mid-range and high frequency signals, a subset of microphones may be used for wind noise processing. In one or more implementations, the remaining microphones not included in the subset of microphones may be used on a bin-by-bin basis based on a proxy level for the level of wind noise present in a respective signal.

In the examples described herein, an image capture may be performed simultaneously using both camera lenses, and audio may be captured using all available microphone elements. Microphone elements used for wind noise detection, wind noise processing, or both, may be automatically switched based on device orientation, user activity, or device setting. In the examples described herein, the terms microphone element and microphone are used interchangeably.

Figure 1A:
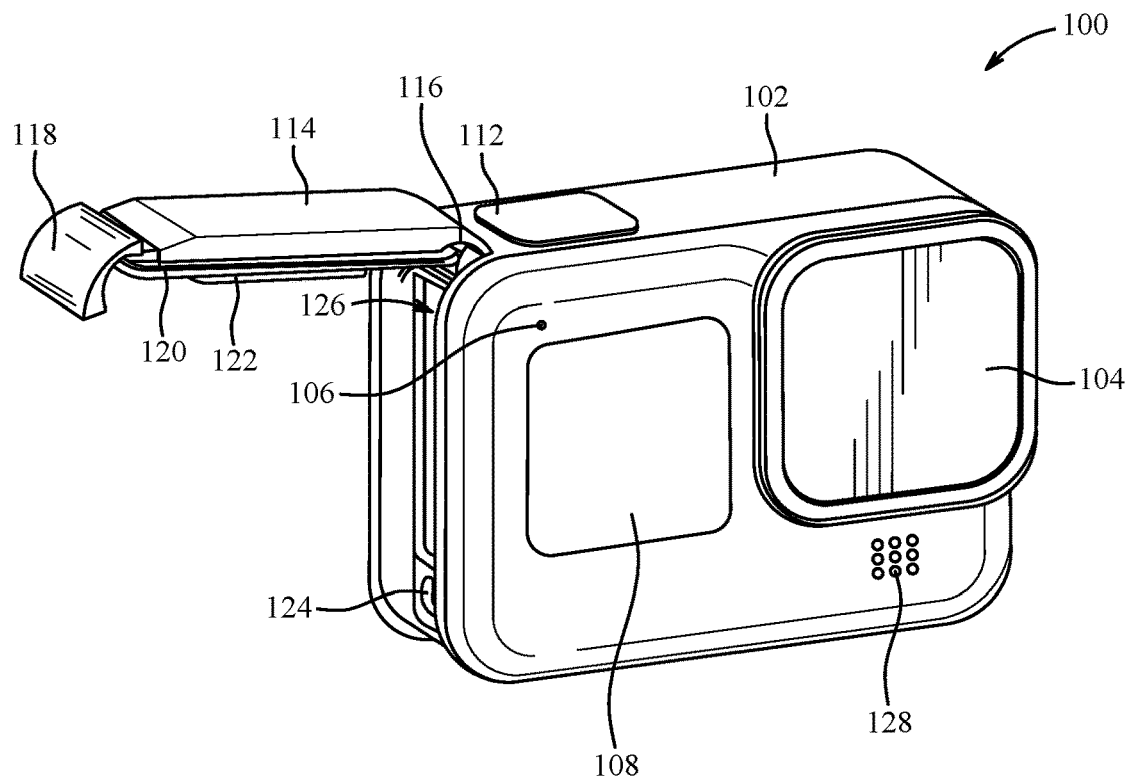
FIGS. 1A-B are isometric views of an example of an image capture device.
Figure 1B:
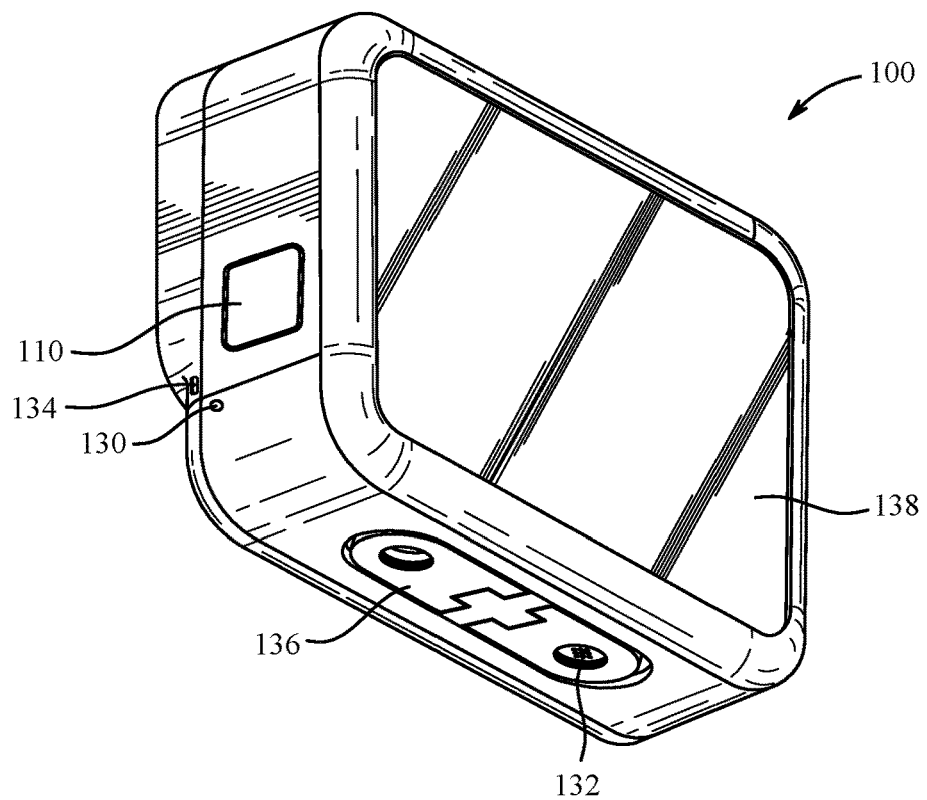

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 8:
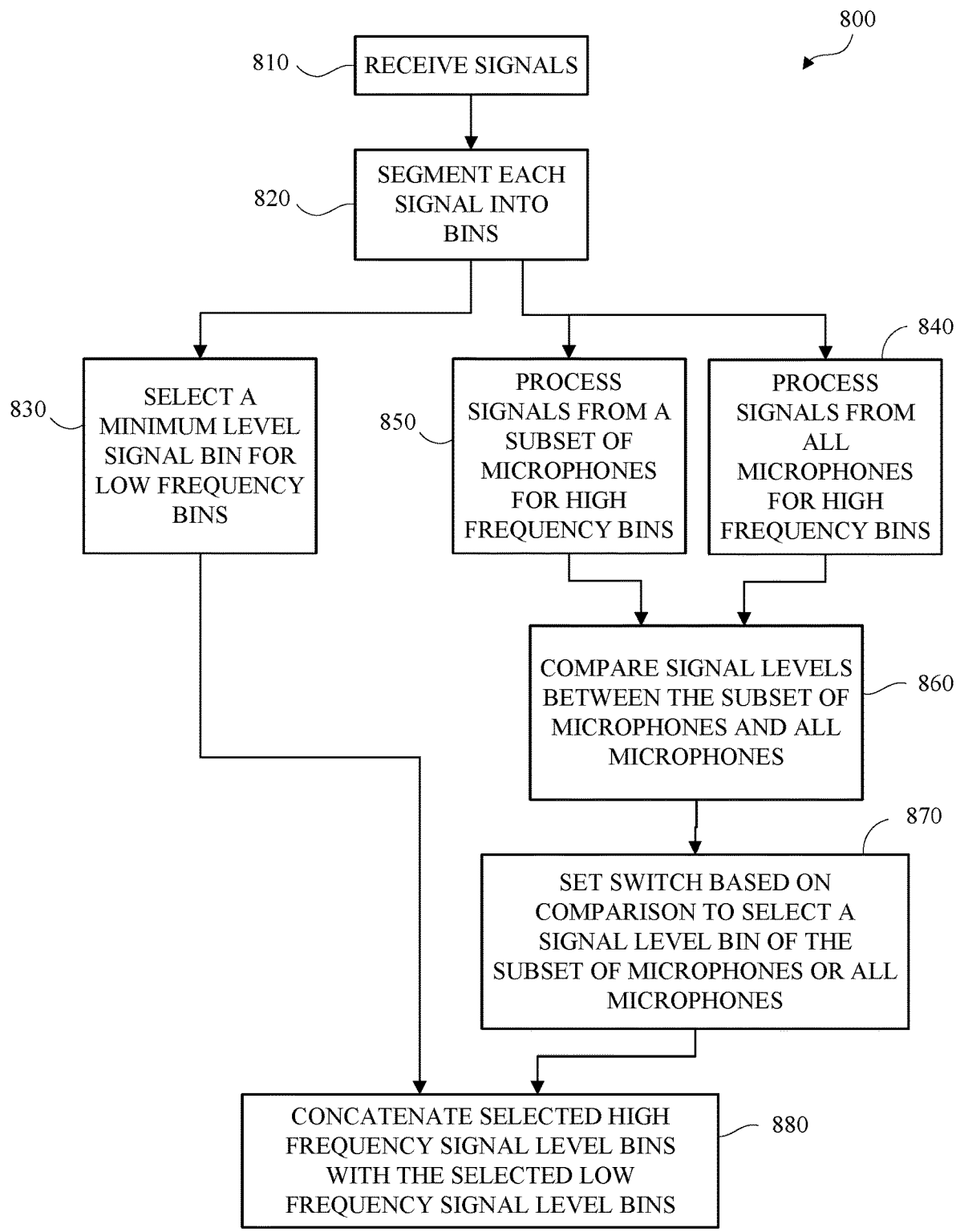
FIG. 8 is a flow diagram of an example of a method for wind noise processing in accordance with embodiments of this disclosure.

The image capture device 100 may be used to implement some or all of the methods described in this disclosure, such as the method 800 described in FIG. 8.

Figure 2A:
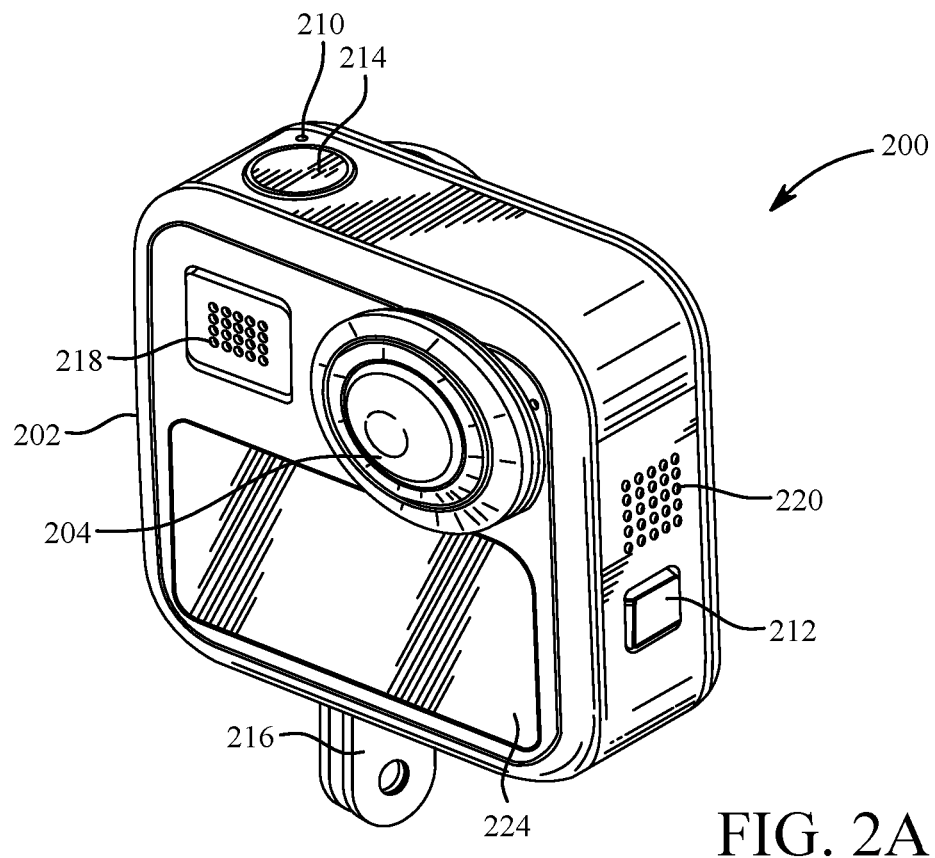
FIGS. 2A-B are isometric views of another example of an image capture device.
Figure 2B:
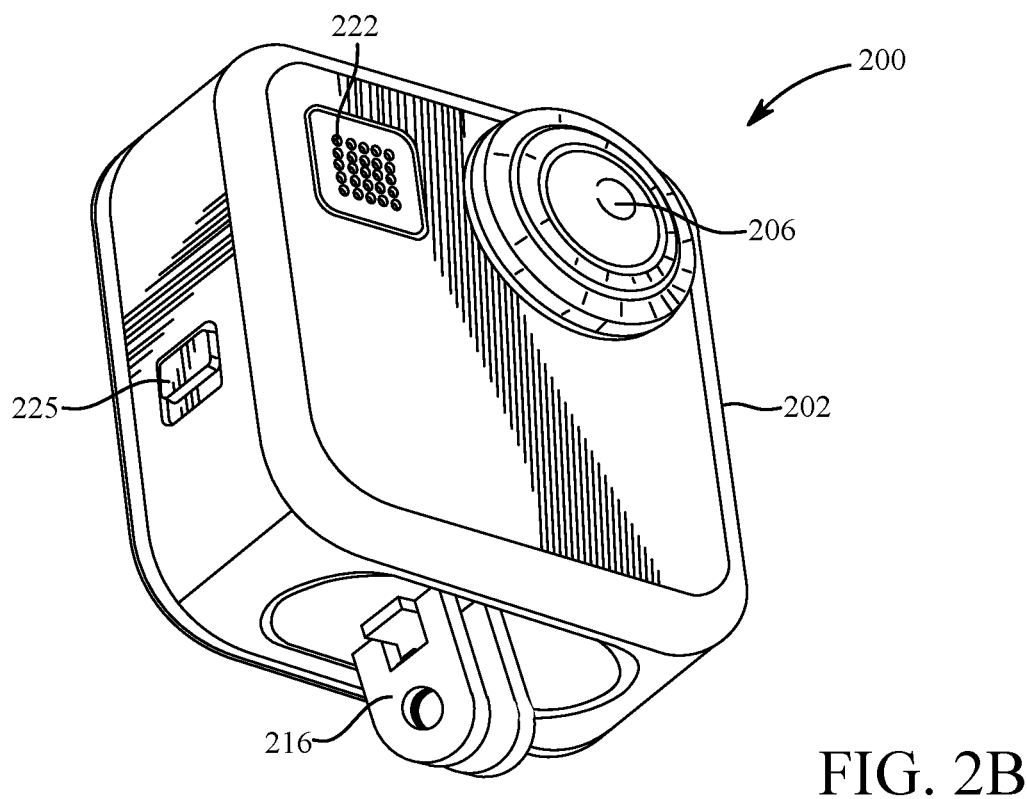

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 2C:
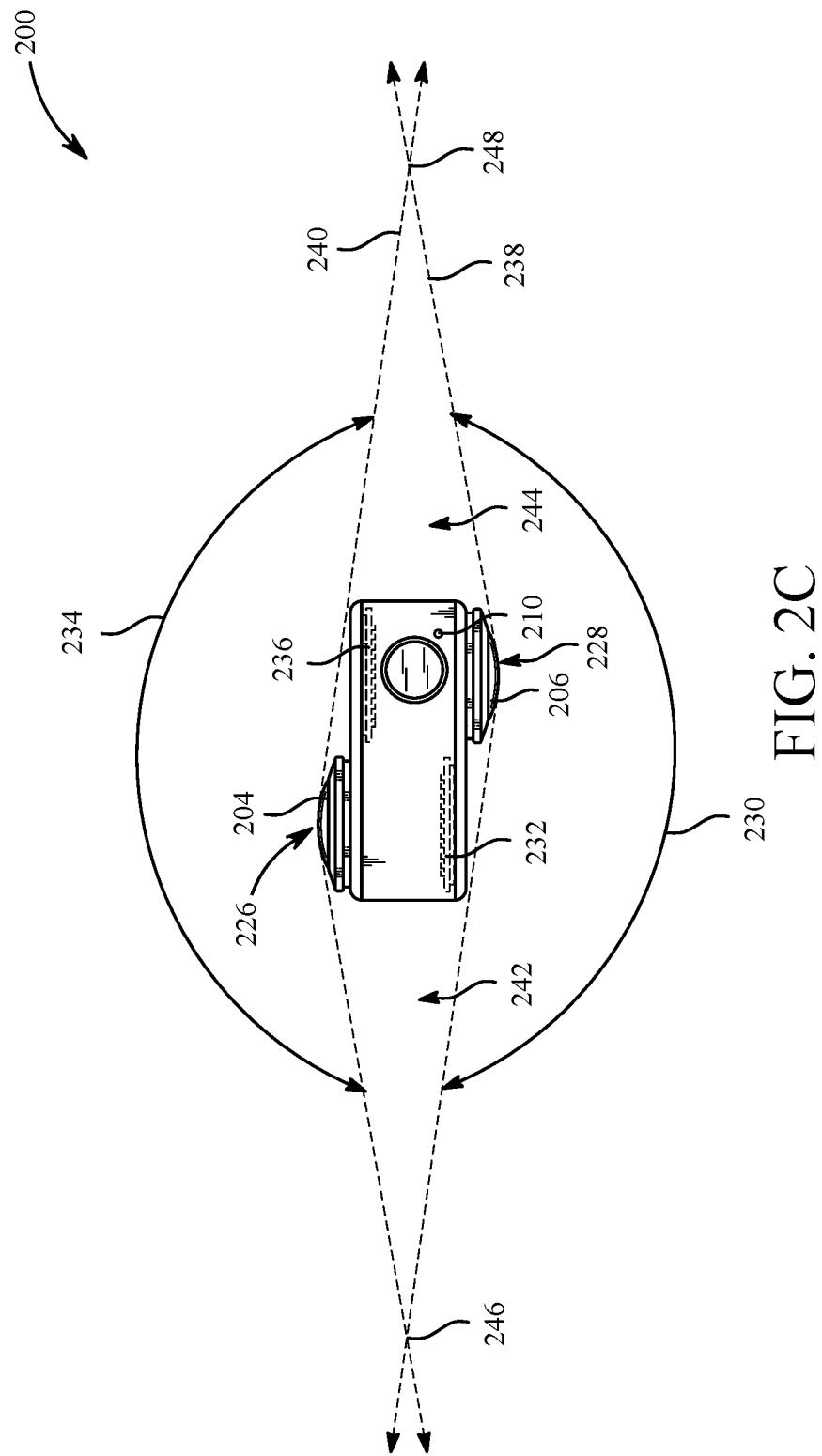
FIG. 2C is a top view of the image capture device of FIGS. 2A-B.
Figure 2D:
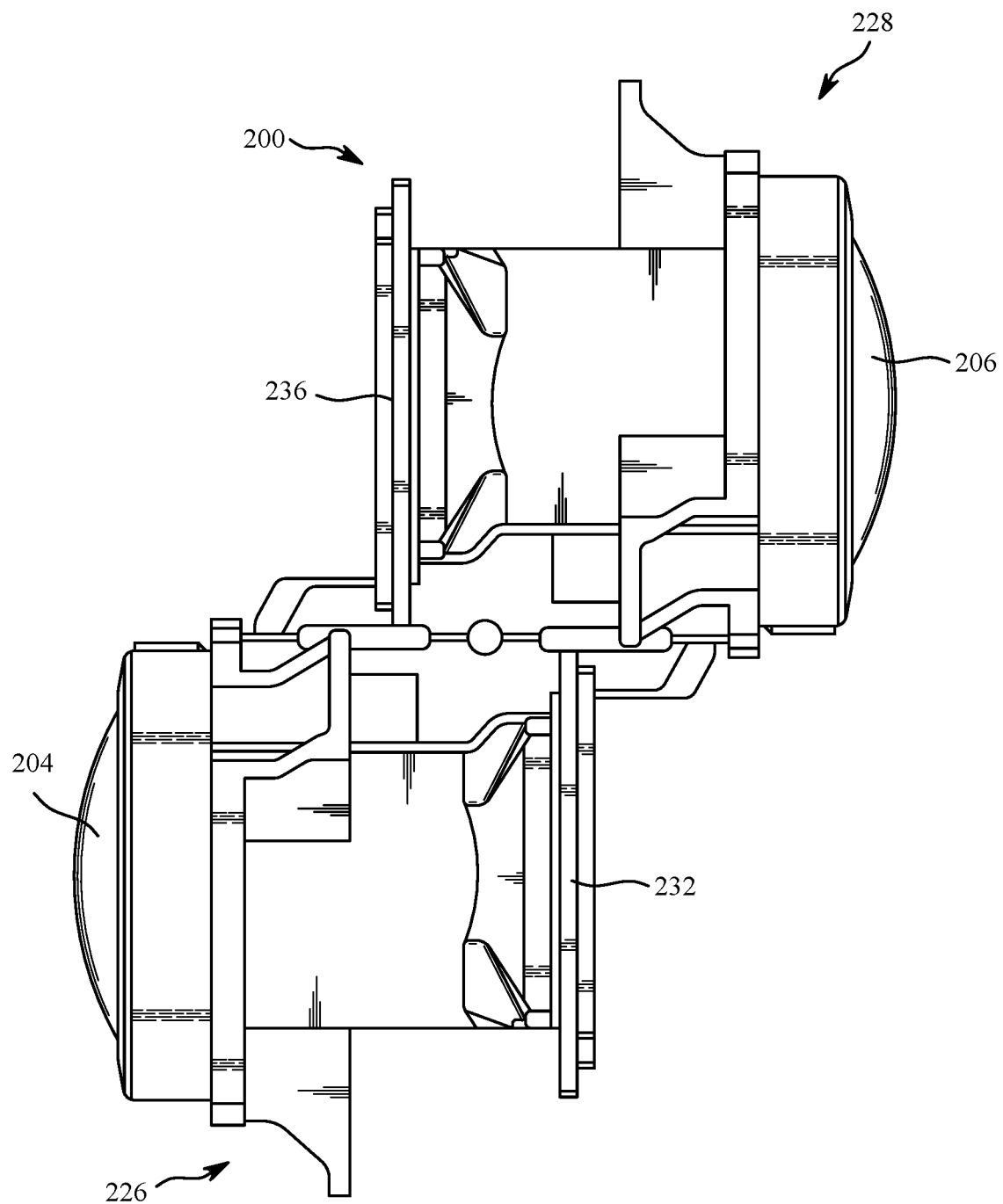
FIG. 2D is a partial cross-sectional view of the image capture device of FIG. 2C.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

The image capture device 200 may be used to implement some or all of the methods described in this disclosure, such as the method 800 described in FIG. 8.

Figure 3:
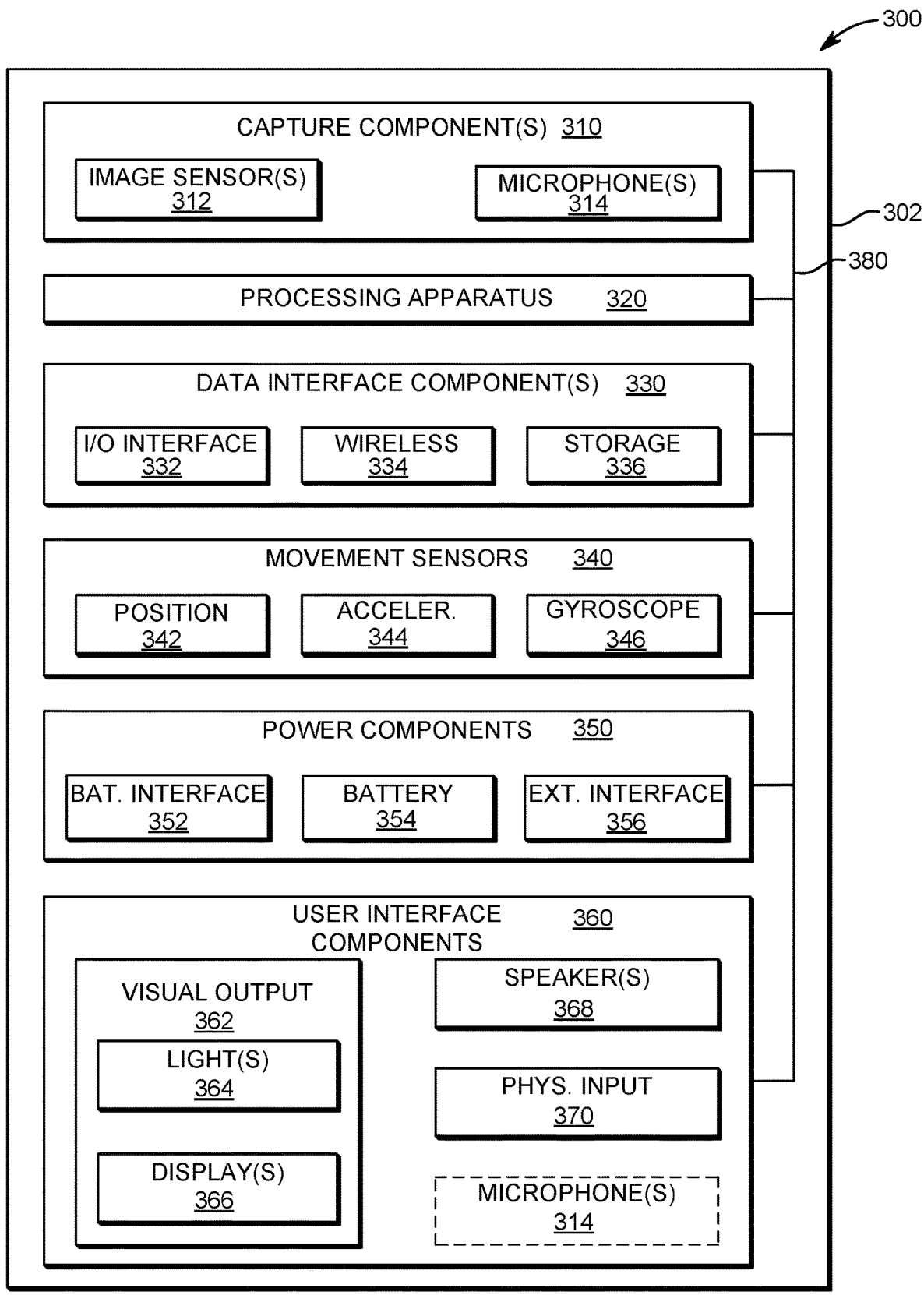
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

The image capture device 300 may be used to implement some or all of the methods described in this disclosure, such as the method 800 described in FIG. 8.

Figure 4A:
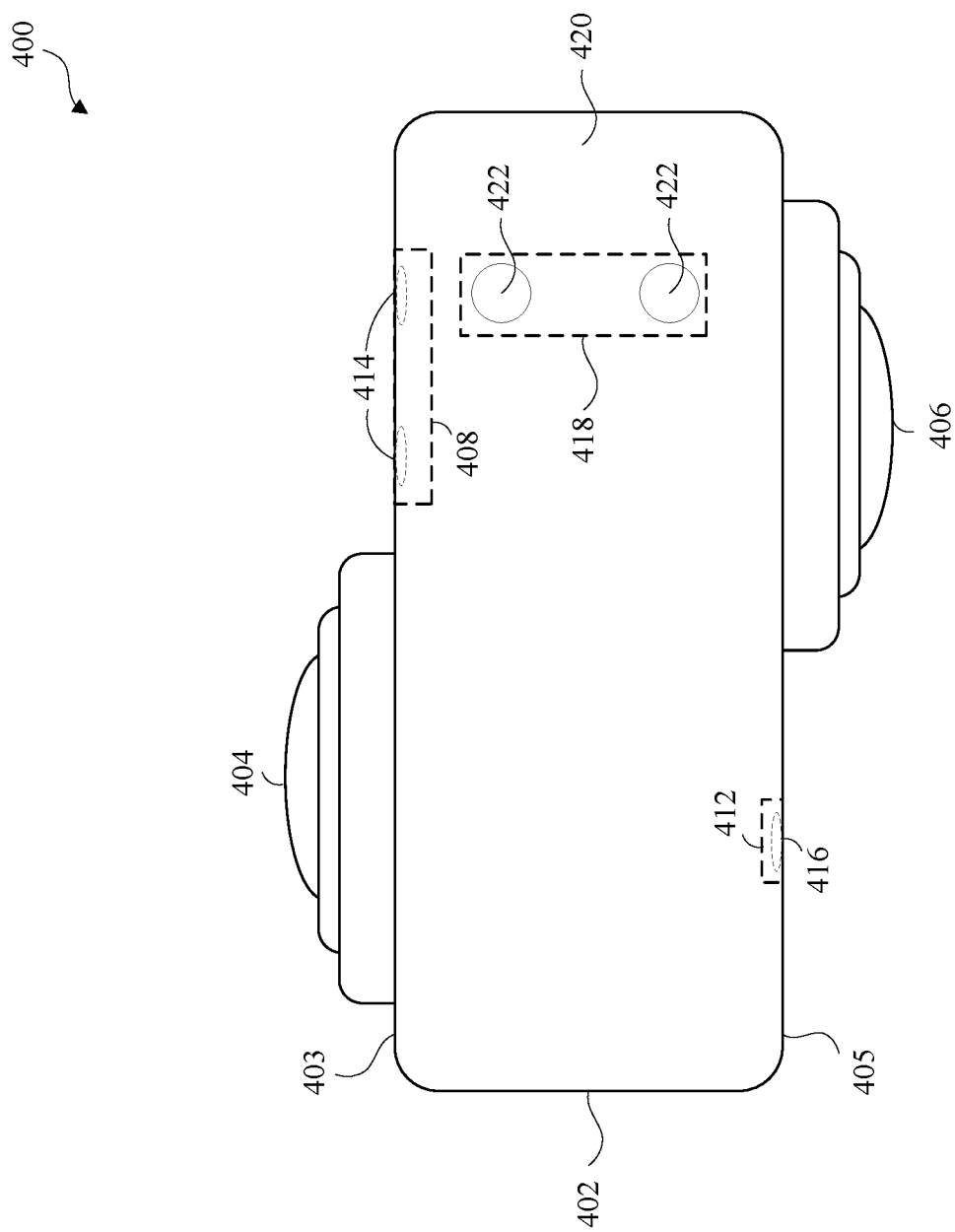
FIG. 4A is a diagram of a top-view of an image capture device in accordance with embodiments of this disclosure.

FIG. 4A is a diagram of a top-view of an image capture device 400 in accordance with embodiments of this disclosure. The image capture device 400 comprises a camera body 402 having two camera lenses 404, 406 structured on front and back surfaces 403, 405 of the camera body 402. The two lenses 404, 406 are oriented in opposite directions and couple with two images sensors mounted on circuit boards (not shown). Other electrical camera components (e.g., an image processor, camera SoC (system-on-chip), etc.) may also be included on one or more circuit boards within the camera body 402 of the image capture device 400.

The lenses 404, 406 may be laterally offset from each other, may be off-center from a central axis of the image capture device 400, or may be laterally offset and off-center from the central axis. As compared to an image capture device with back-to-back lenses, such as lenses aligned along the same axis, the image capture device 400 including laterally offset lenses 404, 406 may include substantially reduced thickness relative to the lengths of the lens barrels securing the lenses 404, 406. For example, the overall thickness of the image capture device 400 may be close to the length of a single lens barrel as opposed to twice the length of a single lens barrel as in a back-to-back configuration.

The image capture device 400 includes a microphone array that comprises a front-facing component 408, a rear-facing component 412, and a side-facing component 418. The front-facing component 408, the rear-facing component 412, and the side-facing component 418 may each be referred to as a microphone assembly. The side-facing component 418 may be on any side of the image capture device 400 that is perpendicular to the front-facing component 408 and the rear-facing component 412, and may include a top surface, a bottom surface, a left surface, a right surface, or any combination thereof. As shown in FIG. 4A, the front-facing component 408 is disposed on the front surface 403 of the image capture device. The front-facing component 408 may include one or more microphone elements 414. The microphone elements 414 may be configured such that they are distanced approximately 6 mm to 18 mm apart. The rear-facing component 412 is disposed on the back surface 405 of the image capture device 400. The rear-facing component 412 may include one or more microphone elements 416. One or more of the microphone elements 416 may be configured as a drain microphone. The side-facing component 418 is shown on a top surface 420 of the image capture device 400 in this example. The side-facing component 418 may include one or more microphone elements 422. The microphone elements 422 may be configured such that they are distanced approximately 6 mm to 18 mm apart. The 6 mm to 18 mm spacing may determine the frequency resolution of the output. For example, the larger the spacing, the lower the highest resolvable frequency. The spacing may be adjusted depending on the resolution required.

The front-facing component 408, microphone elements 414, rear-facing component 412, and microphone elements 416 are shown in broken lines as they may not be visible in this view. The front-facing component 408, rear-facing component 412, and side-facing component 418 of the microphone array may represent microphone elements on an X, Y, Z axis to create X, Y, Z components of a First Order Ambisonics B-Format. These microphone elements may be oriented on a sphere or off-axis, and may be transformed to the First Order Ambisonics B-Format.

Figure 4B:
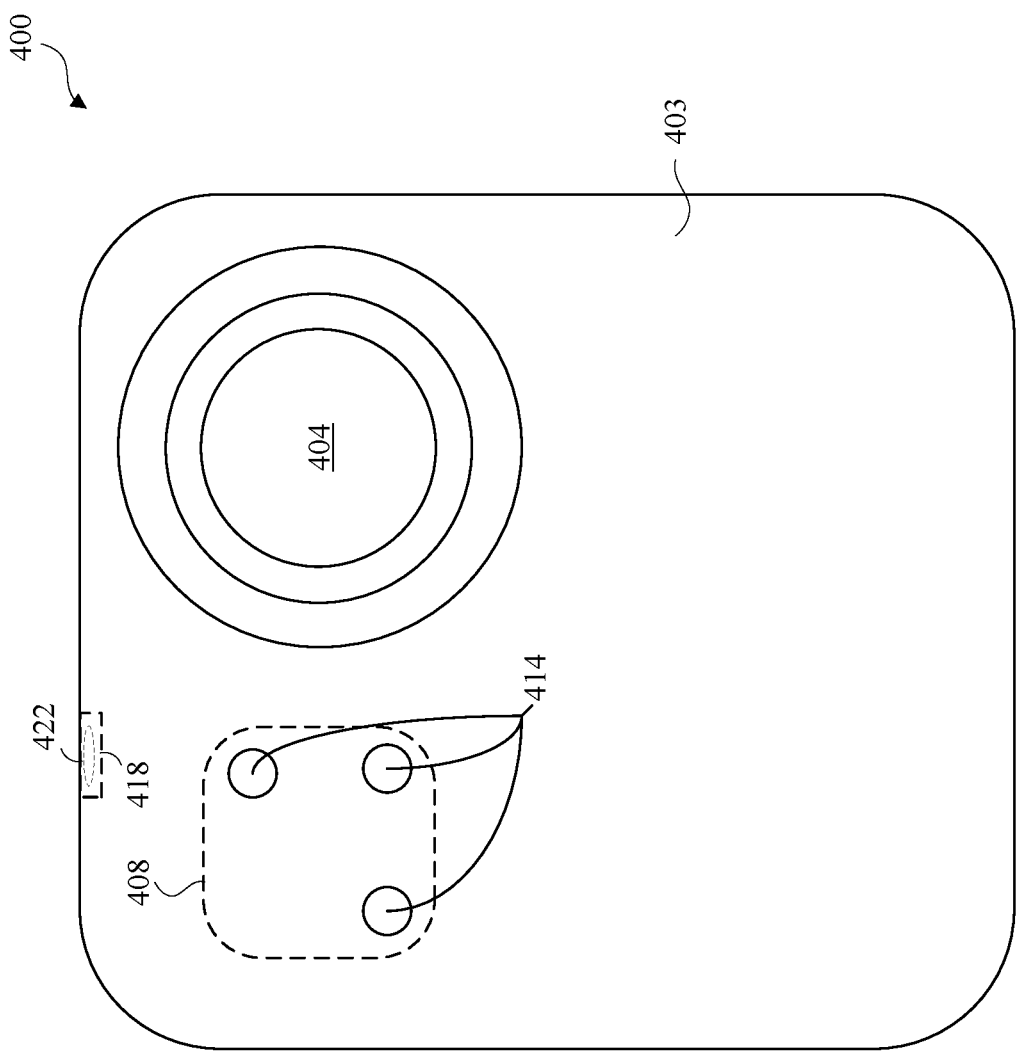
FIG. 4B is a diagram of a front-view of the image capture device shown in FIG. 4A in accordance with embodiments of this disclosure.

FIG. 4B is a diagram of a front-view of the image capture device 400 shown in FIG. 4A in accordance with embodiments of this disclosure. As shown in FIG. 4B, the front surface 403 of the image capture device 400 comprises the camera lens 404 and the front-facing component 408. Although the front-facing component 408 may include any number of microphone elements, the example shown in FIG. 4B includes three microphone elements 414. Each of the microphone elements 414 may be configured such that they are distanced approximately 6 mm to 18 mm apart. The side-facing component 418 and the microphone elements 422 are shown in broken lines as they may not be visible in this view.

Figure 4C:
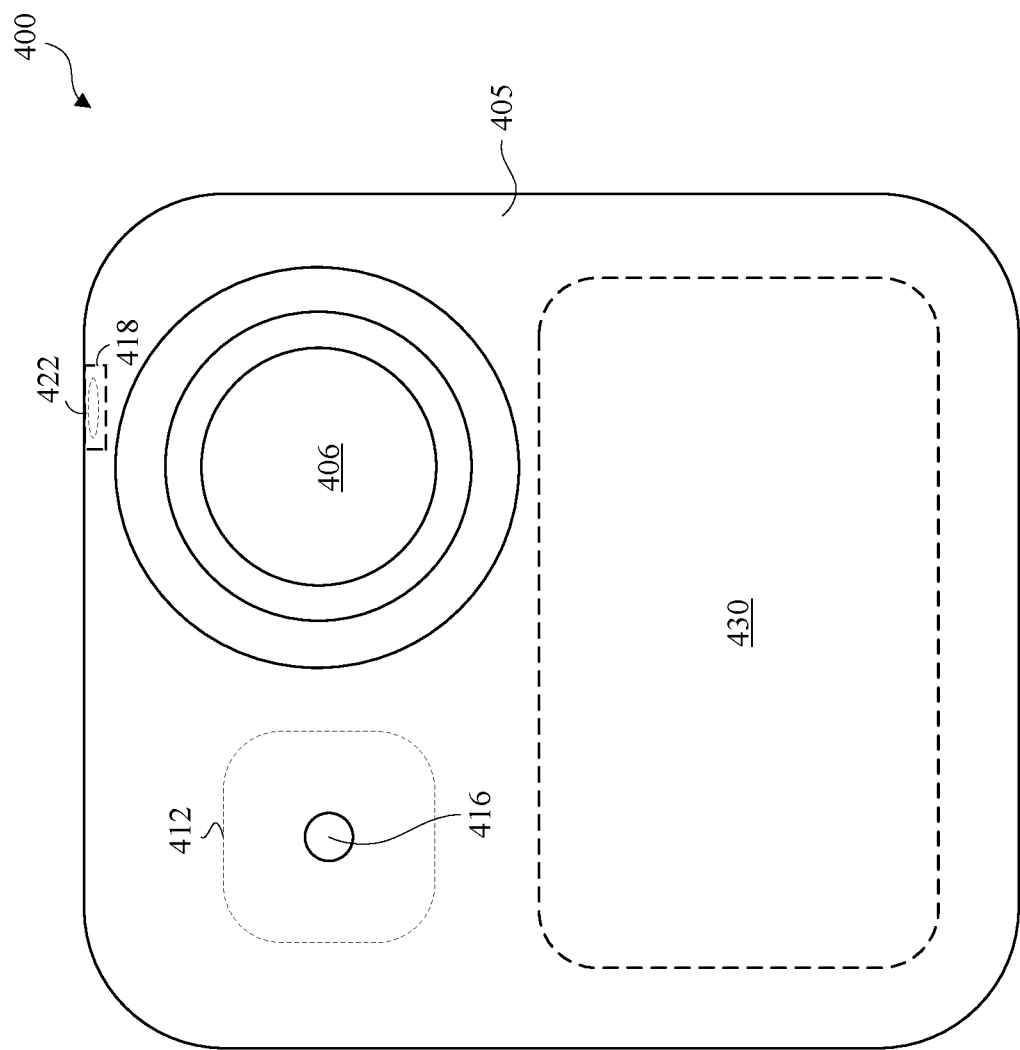
FIG. 4C is a diagram of a rear-view of the image capture device shown in FIG. 4A in accordance with embodiments of this disclosure.

FIG. 4C is a diagram of a rear-view of the image capture device 400 shown in FIG. 4A in accordance with embodiments of this disclosure. As shown in FIG. 4C, the back surface 405 of the image capture device 400 comprises the camera lens 406 and the rear-facing component 412. In an example, the back surface 405 of the image capture device 400 may include an interactive display 430 that allows for interaction with the image capture device 400 while simultaneously displaying information on a surface of the image capture device 400. Although the rear-facing component 412 may include any number of microphone elements, the example shown in FIG. 4C includes one microphone element 416. In an example, one or more of the microphone elements 416 may be configured as a drain microphone. The side-facing component 418 and the microphone elements 422 are shown in broken lines as they may not be visible in this view.

Figure 5:
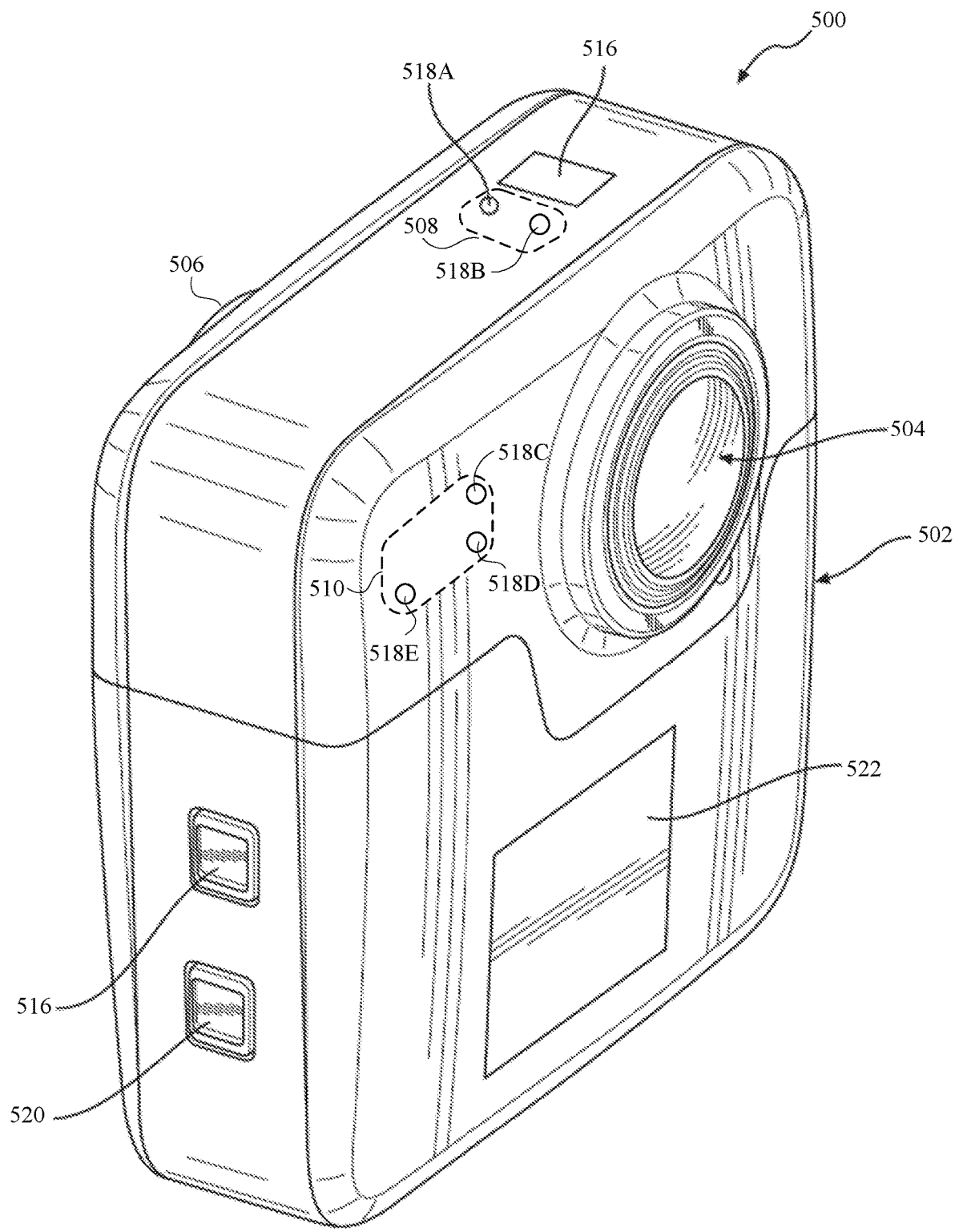
FIG. 5 is a diagram of an isometric view of an image capture device configured for dynamic avoidance of acoustic shadowing in wind noise processing in accordance with embodiments of this disclosure.

FIG. 5 is a diagram of an isometric view of an example of an image capture device 500 configured for dynamic avoidance of acoustic shadowing in wind noise processing in accordance with embodiments of this disclosure. The wind noise processing may be based on sensor data. The sensor data may include, for example data obtained from an image sensor, a microphone, an inertial measurement unit (IMU), a GPS receiver component, a pressure sensor, a temperature sensor, a heart rate sensor, or any other sensor or combination of sensors. In an example where IMU data indicates that the image capture device is lying on its back such that the rear-facing microphone is obstructed, wind noise processing may be performed using a front-facing microphone, a side-facing microphone, a top-facing microphone, or any combination thereof.

The image capture device 500 includes a body 502 and two camera lenses 504, 506 disposed on opposing surfaces of the body 502, for example, in a back-to-back or Janus configuration.

The image capture device may include electronics (e.g., imaging electronics, power electronics, etc.) internal to the body 502 for capturing images via the lenses 504, 506 and/or performing other functions. The image capture device may include various indicators such as an LED light and an LCD display.

The image capture device 500 may include various input mechanisms such as buttons, switches, and touchscreen mechanisms. For example, the image capture device 500 may include buttons 516 configured to allow a user of the image capture device 500 to interact with the image capture device 500, to turn the image capture device 500 on, and to otherwise configure the operating mode of the image capture device 500. In an implementation, the image capture device 500 includes a shutter button and a mode button. It should be appreciated, however, that, in alternate embodiments, the image capture device 500 may include additional buttons to support and/or control additional functionality.

In this view, the image capture device 500 may also include one or more microphones. In this example, the image capture device 500 includes a side-facing component 508 and a front-facing component 510. The side-facing component 508 may be on any side of the image capture device 500 that is perpendicular to the front-facing component 508 and may include a top surface, a bottom surface, a left surface, a right surface, or any combination thereof.

Although the side-facing component 508 may include any number of microphone elements, the example shown in FIG. 5 includes microphone element 518A and microphone element 518B. Although the front-facing component 510 may include any number of microphone elements, the example shown in FIG. 5 includes microphone element 518C, microphone element 518D, and microphone element 518E. Microphone elements 518A-518E are configured to receive and record audio signals (e.g., voice or other audio commands) in conjunction with recording video. Based on the size and geometry of the image capture device 500, microphone elements 518A and 518B may experience lower acoustic shadowing at higher frequencies than the microphone elements 518C, 518D, and 518E. Accordingly, in some implementations, microphone elements 518A and 518B may be selected by default to process higher frequency signals. In some implementations, microphone elements to process higher frequency signals may be automatically selected based on image capture device orientation, image capture device geometry, or both.

The image capture device 500 may include an I/O interface 520 and an interactive display 522 that allows for interaction with the image capture device 500 while simultaneously displaying information on a surface of the image capture device 500.

The image capture device 500 may be made of a rigid material such as plastic, aluminum, steel, or fiberglass. In some embodiments, the image capture device 500 described herein includes features other than those described. For example, instead of the I/O interface 520 and the interactive display 522, the image capture device 500 may include additional interfaces or different interface features. For example, the image capture device 500 may include additional buttons or different interface features, such as interchangeable lenses, cold shoes and hot shoes, and mounts that can add functional features to the image capture device 500.

In an example, the image capture device 500 may perform an image capture using the front-facing camera lens 504 with various microphone patterns based on the user activity, user preference, image capture device orientation, or any combination thereof. The device orientation may be determined using an IMU, gyroscope, accelerometer, or any combination thereof. In this example, the image capture device 500 may be configured to perform an image capture using the front-facing camera lens 504, the rear-facing camera lens 506, or both. The image capture device 500 may capture audio using the side-facing component 508, the front-facing component 510, a rear-facing component such as rear-facing component 412 of FIG. 4A, or any combination thereof. Although each microphone component may include any number of microphone elements, in this example, the side-facing component 508 may include two microphone elements, the front-facing component 510 may include three microphone components, and the rear-facing component 412 includes at least one microphone element.

In this example, a processor, such as processing apparatus 312 of FIG. 3A, may be configured to receive signals from one or more of the microphone elements, for example microphone element 518A, microphone element 518B, microphone element 518C, microphone element 518D, microphone element 518E, microphone element 416 as shown in FIG. 4A, or any combination thereof, during image capture. If the processor detects that wind noise is present, the processor may perform wind noise processing to reduce acoustic shadowing. To perform wind noise processing, the processor may be configured to segment each signal from the microphone elements 518A, 518B, 518C, 518D, 518E, 416, or any combination thereof, into low frequency bins and high frequency bins. Each bin may be a segment of any size, for example, each bin may be a 100 Hz segment of the microphone signal. The threshold for low frequency bins and high frequency bins may be set at any frequency, and may be based on image capture device size and geometry. Since the frequency threshold may be dependent on the image capture device size and geometry, the frequency threshold should be set such that the half wavelength of the frequency threshold is larger than the largest dimension of the image capture device. For example, for an image capture device that has a dimension d, and the speed of sound c (340 m/s), $f=c/(2*d)$. Accordingly, an image capture device that has a 0.05 m as its largest dimension would have a frequency threshold of less than 3400 Hz. In an example, low frequency bins may include bins for frequencies less than 1500 Hz, and high frequency bins may include bins for frequencies greater than 1500 Hz. In another example, low frequency bins may include bins for frequencies less than 1200 Hz, and high frequency bins may include bins for frequencies greater than 1200 Hz.

The processor may be configured to select a minimum level signal bin for each low frequency bin for all microphones from which a signal is received. For the high frequency bins, the processor may be configured to determine a minimum level signal for a first group of microphone elements and a second group of microphone elements. For example, the first group of microphone elements may include all the microphones from which a signal is received. The second group of microphone elements may include microphone element 518A and microphone element 518B. The processor may be configured to determine a difference between the minimum level signal of the first group of microphone elements and the minimum level signal of the second group of microphone elements. The processor may be configured to select a minimum level signal bin for each high frequency bin based on the determined difference. For example, if the determined difference is above a threshold, the processor may select the minimum level signal for the first group of microphone elements for each high frequency bin. If the determined difference is below a threshold, the processor may select the minimum level signal bin for the second group of microphone elements for each high frequency bin. The threshold may be determined by determining how much the acoustic shadow attenuates on average. The threshold may be determined experimentally and implemented using a look up table. The threshold may be set such that when the difference between the minimums is greater than the threshold, the noise is not due to acoustic shadowing and is rather due to wind, therefore all the microphones may be leveraged. If the difference between the minimums is less than the threshold, acoustic shadowing would be introduced if all the microphones are selected at high frequencies, therefore a subset of microphones is selected to avoid acoustic shadowing. The processor may be configured to generate a composite signal by combining the selected minimum level signal bins for each low frequency bin and the selected minimum level signal bins for each high frequency bin.

Figure 6:
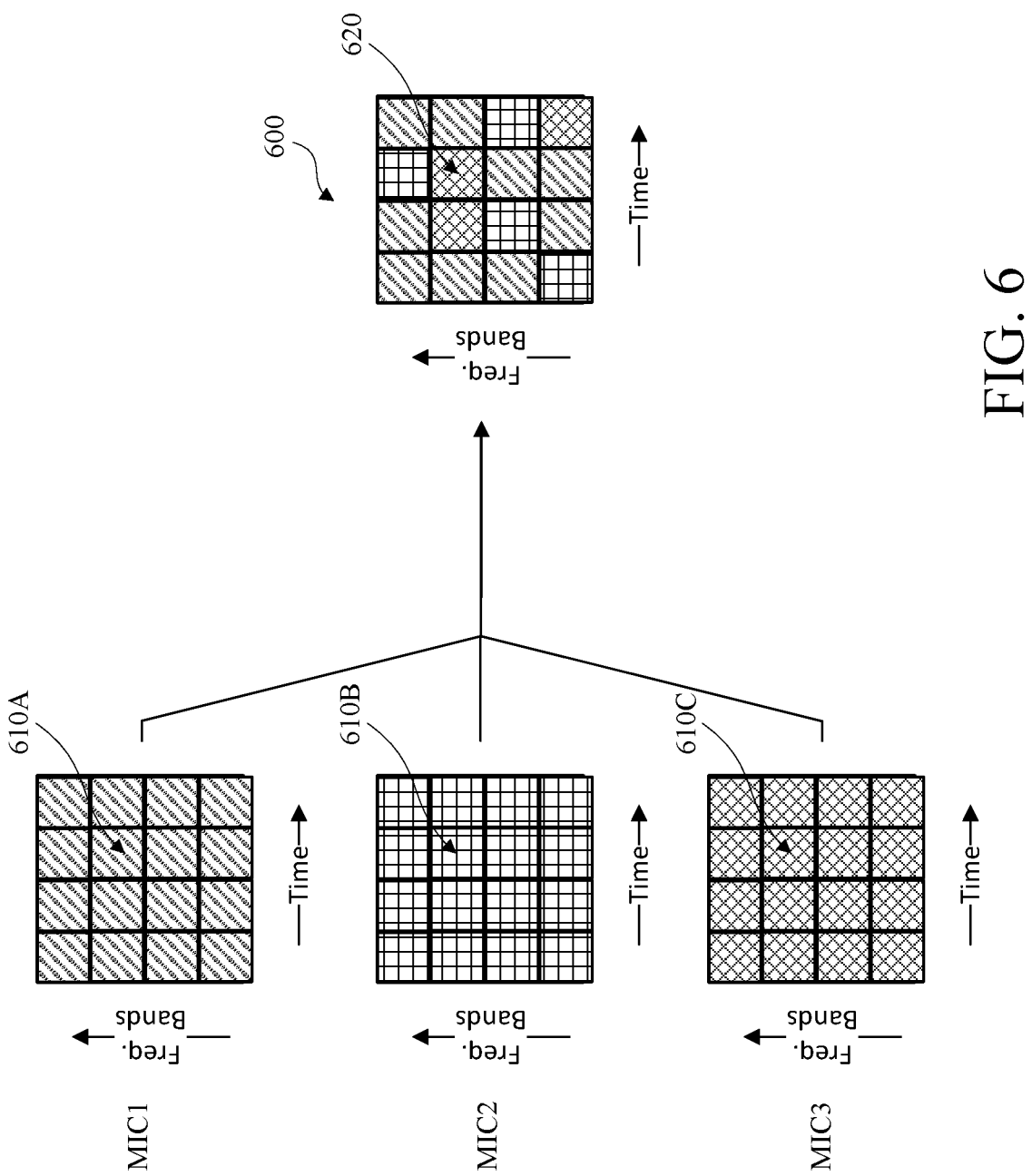
FIG. 6. is a block diagram of an example of a composite microphone signal in accordance with embodiments of this disclosure.

FIG. 6. is a block diagram of an example of a composite microphone signal 600 in accordance with embodiments of this disclosure. As shown in FIG. 6, the composite microphone signal 600 is a combination of signals from multiple microphone elements, for example, microphone element 1 (MIC1), microphone element 2 (MIC2), and microphone element 3 (MIC3). Each block of the composite microphone signal 600 represents a bin or a segment of a signal that has the selected minimum level from multiple signals, in this example, signals from three microphone elements MIC1, MIC2, and MIC3, respectively. As shown in FIG. 6, bin 610A of the signal from MIC1, bin 610B of the signal from MIC2, and bin 610C of the signal from MIC3 are received at the same time and represent the same frequency bin. In this example, bin 610A may have the highest level signal, bin 610C may have the lowest level signal, and bin 610C may have a signal level higher than the signal level of bin 610C. Accordingly, in this example, bin 610C has the minimum level signal and is selected to generate the composite signal 600. As shown in FIG. 6, bin 620 of the composite signal 600 is the selected bin 610C of the signal from MIC3.

Figure 7:
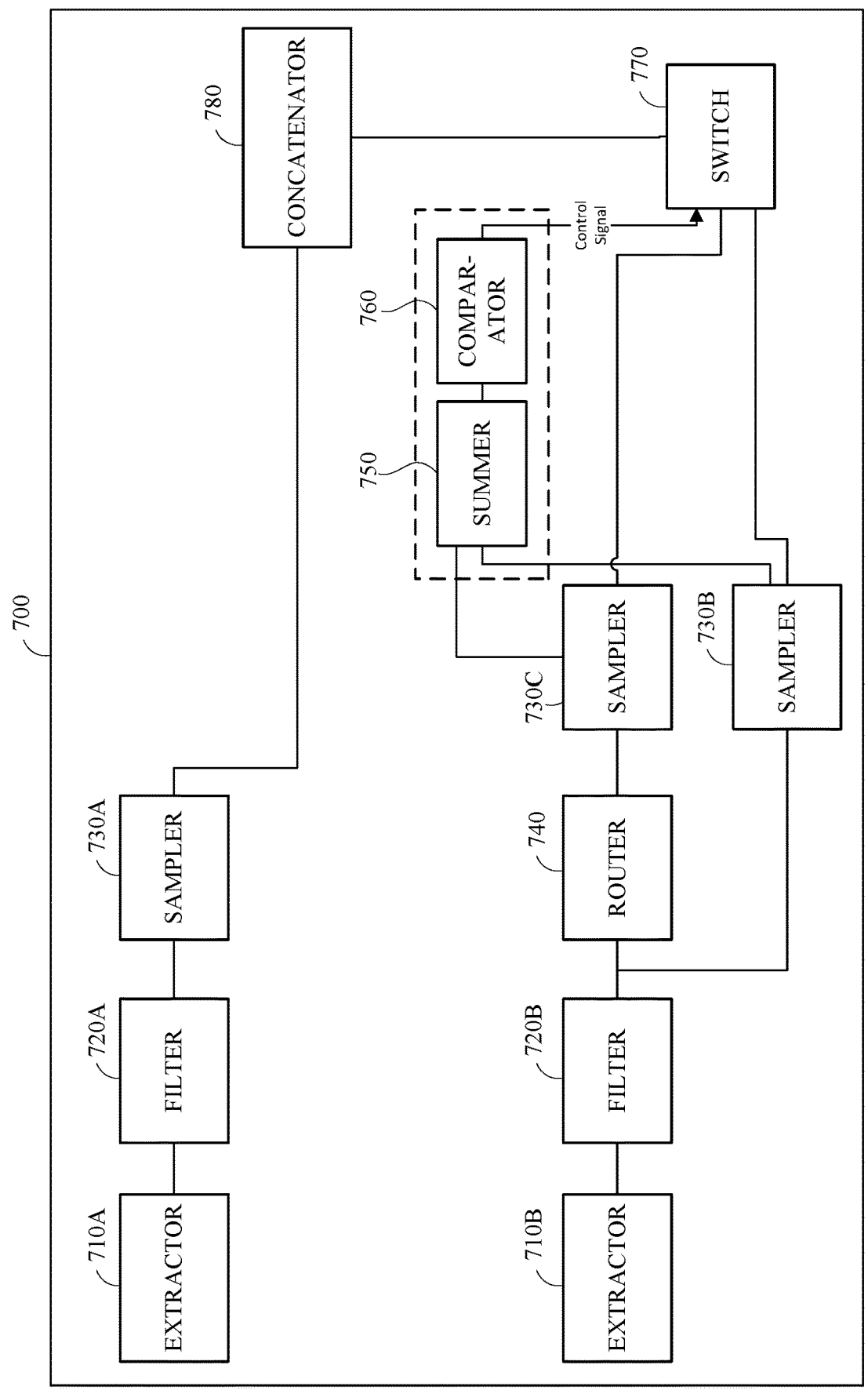
FIG. 7 is a block diagram of an example of an integrated circuit in accordance with embodiments of this disclosure.

FIG. 7 is a block diagram of an example of an integrated circuit 700 in accordance with embodiments of this disclosure. The integrated circuit 700 may be implemented as a processor, such as processing apparatus 312 of FIG. 3A. The integrated circuit 700 may be configured to receive signals from any number of microphone elements and perform wind noise processing. In this example, the integrated circuit is configured to receive signals from six microphone elements. In this example, the presence of wind noise is detected in one or more of the six microphone elements.

As shown in FIG. 7, the integrated circuit 700 includes an extractor 710A for the low frequency path. In this example, the low frequency path is configured to process signals below 1200 Hz. The extractor 710A is configured to receive the low frequency signals from the six microphone elements and segment each low frequency signal into bins. Each bin may be of any size, and in this example, each bin may be a 100 Hz segment of the signal.

The integrated circuit 700 may include a filter 720A coupled to the extractor 710A. The filter 720A may be a low pass filter configured to smooth the complex magnitude such that it does not vary significantly from block to block. The filter 720A may be coupled to a sampler 730A. The sampler 730A is configured to receive the processed signals of the six microphone elements from the filter 720A. The sampler 730A may be configured to select a respective bin, from each of the six microphone signals, that has a minimum level signal for each low frequency bin.

The integrated circuit 700 includes an extractor 710B for the high frequency path. In this example, the high frequency path is configured to process signals above 1200 Hz. The extractor 710B is configured to receive the high frequency signals from the six microphone elements and segment each high frequency signal into bins. Each bin may be of any size, and in this example, each bin may be a 100 Hz segment of the signal.

The integrated circuit 700 may include a filter 720B coupled to the extractor 710B. The filter 720B may be a low pass filter configured to smooth the complex magnitude such that it does not vary significantly from block to block. The filter 720B may be coupled to a sampler 730B. The sampler 730B is configured to receive the processed signals of the six microphone elements from the filter 720B. The sampler 730B may be configured to select a respective bin, from each of the six microphone signals, that has a minimum level signal for each high frequency bin.

As shown in FIG. 7, the filter 720B is coupled to a router 740. The router 740 is configured to receive the processed signals of the six microphone elements from the filter 720B and output a subset of the processed signals. For example, the subset of processed signals may include the processed signals from two or more microphone elements, such as microphone element 518A and microphone element 518B of FIG. 5. The router 740 is coupled to a sampler 730C. The sampler 730C is configured to receive the processed signals of the two microphone elements from the router 740. The sampler 730C may be configured to select a respective bin, from each of the two microphone signals, that has a minimum level signal for each high frequency bin.

The respective outputs of the sampler 730B and sampler 730C are sent to a summer 750. The summer 750 receives the output from sampler 730B and sampler 730C and determines a difference between the outputs. The summer 750 may then send the determined difference to a comparator 760. In some implementations, the summer 750 and the comparator 760 may be a combined unit. The comparator 760 may be configured to receive the determined difference from the summer 750 and send a control signal to switch 770 based on the difference.

If the difference between the minimum level signal for a respective high frequency bin from sampler 730C and the minimum level signal for a respective high frequency bin from sampler 730B is greater than a threshold, the switch 770 is configured to select the minimum level signal for the respective high frequency bin from sampler 730B and send the selection to concatenator 780. If the difference between the minimum level signal for a respective high frequency bin from sampler 730C and the minimum level signal for a respective high frequency bin from sampler 730B is less than a threshold, the switch 770 is configured to select the minimum level signal for the respective high frequency bin from sampler 730C and send the selection to concatenator 780. The concatenator 780 is configured to receive the respective bin selections from sampler 730A, sampler 730B, and sampler 730C. The concatenator 780 is configured to combine the bin selection from sampler 730A, sampler 730B, and sampler 730C to generate a composite signal, for example, the composite signal 600 shown in FIG. 6.

FIG. 8 is a flow diagram of an example of a method 800 for wind noise processing in accordance with embodiments of this disclosure. The method 800 includes receiving signals 810 from any number of microphone elements. In this example, the method 600 may include receiving signals 810 from six microphone elements. In this example, the presence of wind noise may be detected in one or more of the six microphone elements.

As shown in FIG. 8, the method 800 includes segmenting 820 each signal into bins. The bins may be segmented into low frequency bins and high frequency bins. Each bin may be of any size, and in this example, each bin may be a 100 Hz segment of the signal. In this example, the low frequency bins may include signals below 1200 Hz. Referring to FIG. 8, the method 800 includes selecting 830 a minimum level signal bin for each low frequency bin.

The method 800 includes processing 840 signals from all six microphone elements for high frequency bins. In this example, the high frequency bins may include signals above 1200 Hz. Each bin may be of any size, and in this example, each bin may be a 100 Hz segment of the signal. The processing 840 may include filtering the signals to smooth the complex magnitude such that it does not vary significantly from block to block. The processing 840 may include selecting a respective bin, from each of the six microphone signals, that has a minimum level signal for each high frequency bin.

The method 800 includes processing 850 signals from a subset of microphone elements, such as microphone element 518A and microphone element 518B of FIG. 5, for high frequency bins. The processing 850 may include selecting a respective bin, from each of the two microphone signals, that has a minimum level signal for each high frequency bin.

The method 800 includes comparing 860 the signal levels between the subset of microphone elements and all the microphone elements. The comparing 860 includes determining a difference between the signal levels of each selected bin.

The method 800 includes setting 870 a switch based on the comparison. Setting 870 the switch may be to select either a signal level bin of the subset of microphone elements or all the microphone elements. The switch may be selected based on a difference between the minimum level signal for a respective high frequency bin associated with all the microphone elements and the minimum level signal for a respective high frequency bin associated with the subset of microphone elements. If the difference between the minimum level signal for a respective high frequency bin associated with the subset of microphone elements and the minimum level signal for a respective high frequency bin associated with all the microphone elements is greater than a threshold, the setting 870 may include selecting the minimum level signal for the respective high frequency bin associated with all the microphone elements and sending the selection to a concatenator, for example, concatenator 780 of FIG. 7. If the difference between the minimum level signal for a respective high frequency bin associated with the subset of microphone elements and the minimum level signal for a respective high frequency bin associated with all the microphone elements is less than a threshold, the setting 870 may include selecting the minimum level signal for the respective high frequency bin associated with the subset of microphone elements and sending the selection to a concatenator, for example, concatenator 780 of FIG. 7. The method 800 includes concatenating 880 the selected high frequency signal level bins with the selected low frequency signal level bins to generate a composite signal, for example, the composite signal 600 shown in FIG. 6.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:
   a first image sensor facing a first direction, the first image sensor configured to obtain first image data;
   a second image sensor facing a second direction, the second direction being diametrically opposed to the first direction, the second image sensor configured to obtain second image data;
   a microphone facing the first direction;
   a first plurality of microphones facing the second direction;
   a second plurality of microphones facing a third direction that is perpendicular to the first and second directions; and
   a processor configured to:
   receive a signal from the microphone, the first plurality of microphones, and the second plurality of microphones;
   segment each signal into low frequency bins and high frequency bins;
   select a minimum level signal bin for each low frequency bin;

for the high frequency bins, determine a minimum level signal bin for a first group of microphones comprising the microphone, the first plurality of microphones, and the second plurality of microphones, and determine a minimum signal level bin for a second group of microphones comprising the second plurality of microphones;

determine a difference between the minimum level signal bin of the first group of microphones and the minimum level signal bin of the second group of microphones;

select a minimum level signal bin for each high frequency bin based on the difference; and generate a composite signal by combining the selected minimum level signal bins for each low frequency bin and the selected minimum level signal bins for each high frequency bin.

2. The image capture device of claim 1, wherein the first plurality of microphones comprises three microphones.

3. The image capture device of claim 1, wherein the second plurality of microphones experience lower acoustic shadowing than the first plurality of microphones.

4. The image capture device of claim 1, wherein the processor is configured to select the minimum level signal bin for each low frequency bin from the microphone, the first plurality of microphones, and the second plurality of microphones.

5. The image capture device of claim 1, wherein the difference between the minimum level signal bin of the first group of microphones and the minimum level signal bin of the second group of microphones is greater than a threshold, the processor further configured to select the minimum level signal bin of the first group of microphones.

6. The image capture device of claim 1, wherein the difference between the minimum level signal bin of the first group of microphones and the minimum level signal bin of the second group of microphones is less than a threshold, the processor further configured to select the minimum level signal bin of the second group of microphones.

7. The image capture device of claim 1, wherein the low frequency bins comprise signals having frequencies less than 1200 Hz and the high frequency bins comprise signals having frequencies greater than 1200 Hz.

8. A method comprising:

receiving signals from a plurality of microphones;

segmenting each signal into low frequency bins and high frequency bins;

selecting, for each low frequency bin, a minimum level signal bin for each signal from the plurality of microphones;

processing, for each high frequency bin, signals from the plurality of microphones and signals from a subset of the plurality of microphones;

comparing the signals from the plurality of microphones and the signals from the subset of the plurality of microphones;

selecting, for each high frequency bin, a minimum signal level bin for each signal from the plurality of microphones or a minimum signal level bin for each signal from the subset of the plurality of microphones; and concatenating the selected minimum level signal bins of the low frequency bins with the selected minimum level signal bins of the high frequency bins.

9. The method of claim 8, further comprising determining a difference between the minimum level signal bin of the plurality of microphones and the minimum level signal bin of the subset of the plurality of microphones.

10. The method of claim 9, wherein on a condition that the difference is greater than a threshold, selecting the minimum level signal bin of the plurality of microphones for each high frequency bin.

11. The method of claim 9, wherein on a condition that the difference is less than a threshold, selecting the minimum level signal bin of the subset of the plurality of microphones.

12. The method of claim 8, wherein the subset of the plurality of microphones is based on an image capture device orientation or geometry.

13. The method of claim 8, wherein the subset of the plurality of microphones include a pair of microphones on a top surface of a body of an image capture device.

14. The method of claim 8, wherein the processing includes filtering the signals to remove low level noise.

15. An integrated circuit comprising:

a first extractor configured to receive signals from a microphone, a first plurality of microphones, and a second plurality of microphones and segment each signal into low frequency bins and high frequency bins;

a second extractor configured to receive the signals from the microphone, the first plurality of microphones, and the second plurality of microphones and segment each signal into low frequency bins and high frequency bins;

a first sampler configured to select a minimum level signal bin for each low frequency bin;

a second sampler for the high frequency bins, the second sampler configured to determine a minimum level signal bin for a first group of microphones comprising the microphone, the first plurality of microphones, and the second plurality of microphones, a third sampler for the high frequency bins, the third sampler configured to determine a minimum signal level bin for a second group of microphones comprising the second plurality of microphones;

a comparator configured to determine a difference between the minimum level signal bin of the first group of microphones and the minimum level signal bin of the second group of microphones;

a switch configured to select a minimum level signal bin for each high frequency bin based on the difference; and a concatenator configured to generate a composite signal by combining the selected minimum level signal bins for each low frequency bin and the selected minimum level signal bins for each high frequency bin.

16. The integrated circuit of claim 15, wherein the difference between the minimum level signal bin of the first group of microphones and the minimum level signal bin of the second group of microphones is greater than a threshold, and the switch is further configured to select the minimum level signal bin of the first group of microphones.

17. The integrated circuit of claim 15, wherein the difference between the minimum level signal bin of the first group of microphones and the minimum level signal bin of the second group of microphones is less than a threshold, and the switch is further configured to select the minimum level signal bin of the second group of microphones.

18. The integrated circuit of claim 15 further comprising:

a router configured to receive the signals from the microphone, the first plurality of microphones, and the second plurality of microphones and output a subset of signals.

19. The integrated of claim 18, wherein the subset of signals comprises signals from the second group of microphones.

20. The integrated circuit of claim 15, wherein the comparator is configured to transmit a control signal to the switch.

\* \* \* \* \*